United States Patent [19]
Spaulding et al.

[11] Patent Number: 5,822,451
[45] Date of Patent: Oct. 13, 1998

[54] METHOD FOR HALFTONING A MULTI-CHANNEL DIGITAL COLOR IMAGE

[75] Inventors: Kevin Edward Spaulding, Spencerport; Rodney L. Miller, Fairport; Jay S. Schildkraut, Rochester, all of N.Y.

[73] Assignee: Eastman Kodak Company, Rochester, N.Y.

[21] Appl. No.: 658,452

[22] Filed: Jun. 5, 1996

[51] Int. Cl.[6] .................................................. G06K 9/00
[52] U.S. Cl. .................... 382/162; 382/270; 358/535; 358/457
[58] Field of Search .................... 382/162, 166, 382/167, 252, 270; 358/535, 515, 457

[56] References Cited

U.S. PATENT DOCUMENTS

| | | | |
|---|---|---|---|
| 4,595,948 | 6/1986 | Itoh et al. | 358/75 |
| 4,920,501 | 4/1990 | Sullivan et al. | 364/518 |
| 5,111,310 | 5/1992 | Parker et al. | 358/456 |
| 5,214,517 | 5/1993 | Sullivan et al. | 358/456 |
| 5,291,311 | 3/1994 | Miller | 358/456 |
| 5,317,418 | 5/1994 | Lin | 358/456 |
| 5,341,228 | 8/1994 | Parker et al. | 358/534 |
| 5,469,515 | 11/1995 | Lin | 382/237 |

OTHER PUBLICATIONS

David E. Goldberg, "Genetic Algorithms in Search, Optimization, and Machine Learning", Addison Wesley Publishing Company, Inc., pp. 1–23.

Primary Examiner—Phuoc Tran
Attorney, Agent, or Firm—Thomas H. Close

[57] ABSTRACT

A method for halftoning a multi-channel digital color image having an x,y array of color pixel values, includes the steps of: providing a matrix of dither values for each color channel of the digital color image wherein two or more of the matrices of dither values are designed jointly to minimize a visual cost function; for each color channel modularly addressing the matrix of dither values with the location of a pixel in the digital color image to obtain an addressed dither value; comparing the addressed dither value for each color channel with the pixel value for the corresponding color channel to determine an output halftone image value for each color channel; and repeating steps b and c for each pixel in the digital image.

39 Claims, 9 Drawing Sheets

METHOD FOR HALFTONING A MULTI-CHANNEL DIGITAL COLOR IMAGE

FIELD OF THE INVENTION

This invention relates generally to the field of digital image processing and more particularly to a method for halftoning digital color images for a color output device.

BACKGROUND OF THE INVENTION

Halftoning is a technique that is commonly used in digital imaging to create the appearance of intermediate tones when only two colorant levels (i.e., ink or no ink) are available. Halftoning methods rely on the fact that an observer's eye will spatially average over some local area of the image so that intermediate tone levels can be created by turning some of the pixels "on" and some of the pixels "off" in some small region. The fraction of the pixels which are turned on will determine the apparent gray level. Examples of common halftoning techniques include ordered dither and error-diffusion.

The ordered dither technique is typically implemented by forming a dither matrix having $M_x \times M_y$ elements which is tiled across the image. The elements of the dither matrix are distributed across the range of expected input tone values so that the full range of tones can be reproduced. A basic flow chart for this approach is shown in FIG. 1. A given pixel in the image has column and row addresses x and y, respectively, and an input pixel value I(x,y). Modulo operators 10 are used to determine indices $x_d$ and $Y_d$ that are used to address the dither matrix 12. The modulo operators 10 compute the value $x_d$ or $Y_d$ by determining the remainder when the pixel address x or y is divided by the dither matrix dimension $M_x$ or $M_y$, respectively. This process is referred to as "modularly addressing" the dither matrix. The dither value $d(x_d, y_d)$ stored in the dither matrix at this address is then compared to the input pixel value I(x,y) using a comparator 14. If the input pixel value is below the dither value, the output pixel value O(x,y) is set to "off"; if the value is above the dither value, the output pixel value O(x,y) is set to "on".

A second implementation of this basic technique is shown in FIG. 2. In this case the dither value $d(x_d, y_d)$ is combined with the input pixel value I(x,y) using an adder 24. A threshold operator 26 is then used to threshold the combined value to determine the output pixel value O(x,y). If the combined value is below the threshold, the pixel is set to "off"; if the combined value is greater, the output is set to "on."

Yet another implementation of this basic technique is shown in FIG. 3. In this case a set of k dither bitmaps 32 are formed corresponding to the halftone patterns formed when the dither matrix is thresholded at each input level k. The input pixel value I(x,y) is then used to select which of the dither bitmaps should be used for each pixel. Modulo operators 30 are used to determine indices $x_d$ and $Y_d$ that are used to address the selected dither bitmap to determine the output pixel value O(x,y). This implementation has the advantage that fewer computations are necessary to process each pixel. It should be noted that any dither pattern which can be implemented using the methods of FIG. 1 and FIG. 2 can also be implemented using the method of FIG. 3. However, it is possible to define a set of dither bitmaps for the method of FIG. 3 which could not he implemented using the other methods. This is because in the dither matrix implementations shown in FIGS. 1 and 2, once a certain pixel is turned on at the input value corresponding to the dither value, it will stay on for all higher input values. With the dither bitmaps approach shown in FIG. 3, this constraint is not present. For example, a certain pixel could be "off" for an input value of 150, "on" for an input value of 151, and "off" again for an input value of 152.

A variety of different dither matrices have been used in the past which create resulting images with differing visual characteristics. Common types include random dither matrices, clustered-dot dither matrices, and Bayer (dispersed dot) dither matrices. Sullivan and Miller (U.S. Pat. No. 4,920,501) have recently introduced a technique to design dither bitmaps which have minimum visual modulation. These patterns are sometimes called "blue-noise" patterns. They are attractive in that the patterns that are produced have minimum visibility to human observers, and as a result the images produced are visually pleasing relative to images produced using other patterns. The basic procedure involved in the creation of these patterns is to use an optimization technique, such as stochastic annealing, to determine the arrangement of the matrix elements which minimizes some cost function based upon weighting the frequency components of the halftone patterns with a human visual sensitivity function. Sullivan and Ray have also disclosed an enhancement to this method which insures that the bitmaps for each of the gray levels are correlated in such a way that they can be implemented using a dither matrix (U.S. Pat. No. 5,214,517). Other extensions to this basic approach include a method for simultaneously optimizing all of the gray levels (see U.S. patent application Ser. No. 07/848,779 by Ray), and a method for designing blue-noise dither matrices for use with multi-level output devices (see U.S. patent application, Ser. No. 08/331,246 by Spaulding and Ray).

Parker and Mitsa (U.S. Pat. No. 5,111,310) and Lin (U.S. Pat. Nos. 5,317,418 and 5,469,515) have also recently introduced techniques for the design of dither patterns. Although the actual optimization methods that they have used are somewhat different, the resulting patterns are quite similar to those created using the methods described in the Sullivan et al. patents.

When producing color images on binary output devices it is necessary to halftone each of the color channels. Typically the color planes are cyan, magenta and yellow (CMY), or cyan, magenta, yellow and black (CMYK). If the same halftoning pattern is used for each of the color channels this is known as "dot-on-dot" printing. This approach is rarely used in practice because it results in a higher level of luminance modulation, and additionally the color reproduction characteristics will be more sensitive to registration errors. The higher level of luminance modulation will cause the halftone patterns to be more visible than one of the color channels printed alone. The increased sensitivity to registration errors may cause the reproduced color to drift page to page, or even within a page, as the registration characteristics of printing apparatus change. In the graphic arts field the preferred solution has typically been to decorrelate the halftone patterns by rotating the halftone patterns to different "screen angles." For conventional graphic arts halftone methods, this rotation can either be accomplished optically or digitally.

A number of techniques have been suggested for decorrelating the halftone patterns used for ordered dither (for example see U.S. Pat. No. 5,341,228). These include using independently derived dither matrices for each color channel, spatially shifting the dither matrix patterns for each color plane relative to a reference dither matrix, and using an inverse dither matrix for one or more of the color channels.

Each of these techniques has the advantage that the halftone patterns for the different color channels will be decorrelated, and therefore the resulting halftone image should produce lower amounts of luminance modulation and sensitivity to registration errors relative to the nominal dot-on-dot printing case. However, none of these techniques will produce images that will exhibit optimal appearance, particularly with respect to the visibility of the halftone patterns.

SUMMARY OF THE INVENTION

The problems noted above are solved according to the present invention by providing a method for halftoning a multi-channel digital color image having an x,y array of color pixel values, includes the steps of: providing a matrix of dither values for each color channel of the digital color image wherein two or more of the matrices of dither values are designed jointly to minimize a visual cost function; for each color channel modularly addressing the matrix of dither values with the location of a pixel in the digital color image to obtain an addressed dither value; comparing the addressed dither value for each color channel with the pixel value for the corresponding color channel to determine an output halftone image value for each color channel; and repeating steps b and c for each pixel in the digital image.

ADVANTAGEOUS EFFECT OF THE INVENTION

The present invention has the advantage over prior art methods of applying minimum visibility dither patterns to color images in that it uses jointly optimized halftone patterns to account for the interactions between the color channels. As a result, it is possible to produce color halftone images having halftones patterns that are less visible to a human observer.

DETAILED DESCRIPTION OF THE INVENTION

The present invention comprises a method to compute a set of dither matrices for a color imaging device so as to minimize the visibility of halftone patterns generated using the dither matrices. In the following embodiments, it will be assumed that the imaging device has cyan, magenta, and yellow color channels, but it should be noted that this technique can easily be generalized to other types of imaging systems such as RGB devices, or CMYK devices.

Figure 1:
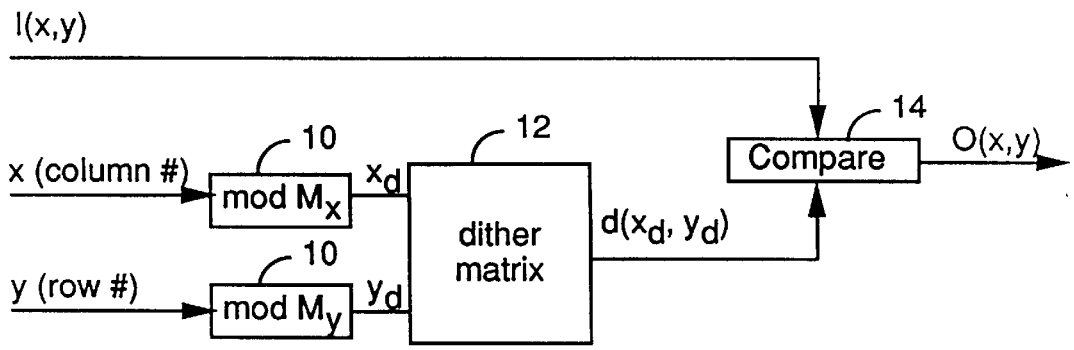
FIGS. 1–3 are schematic block diagrams showing prior art ordered dither techniques for halftoning.
Figure 2:
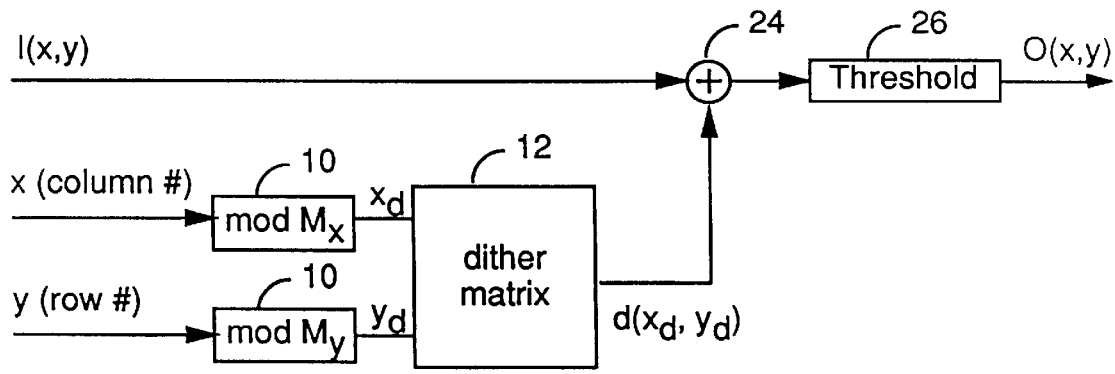
Figure 3:
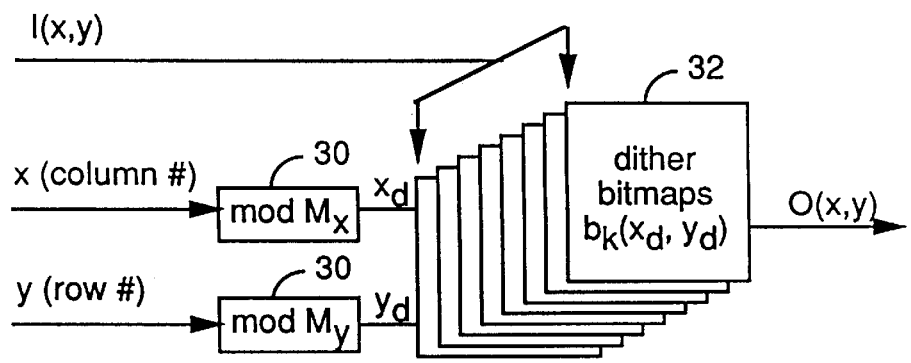
Figure 4:
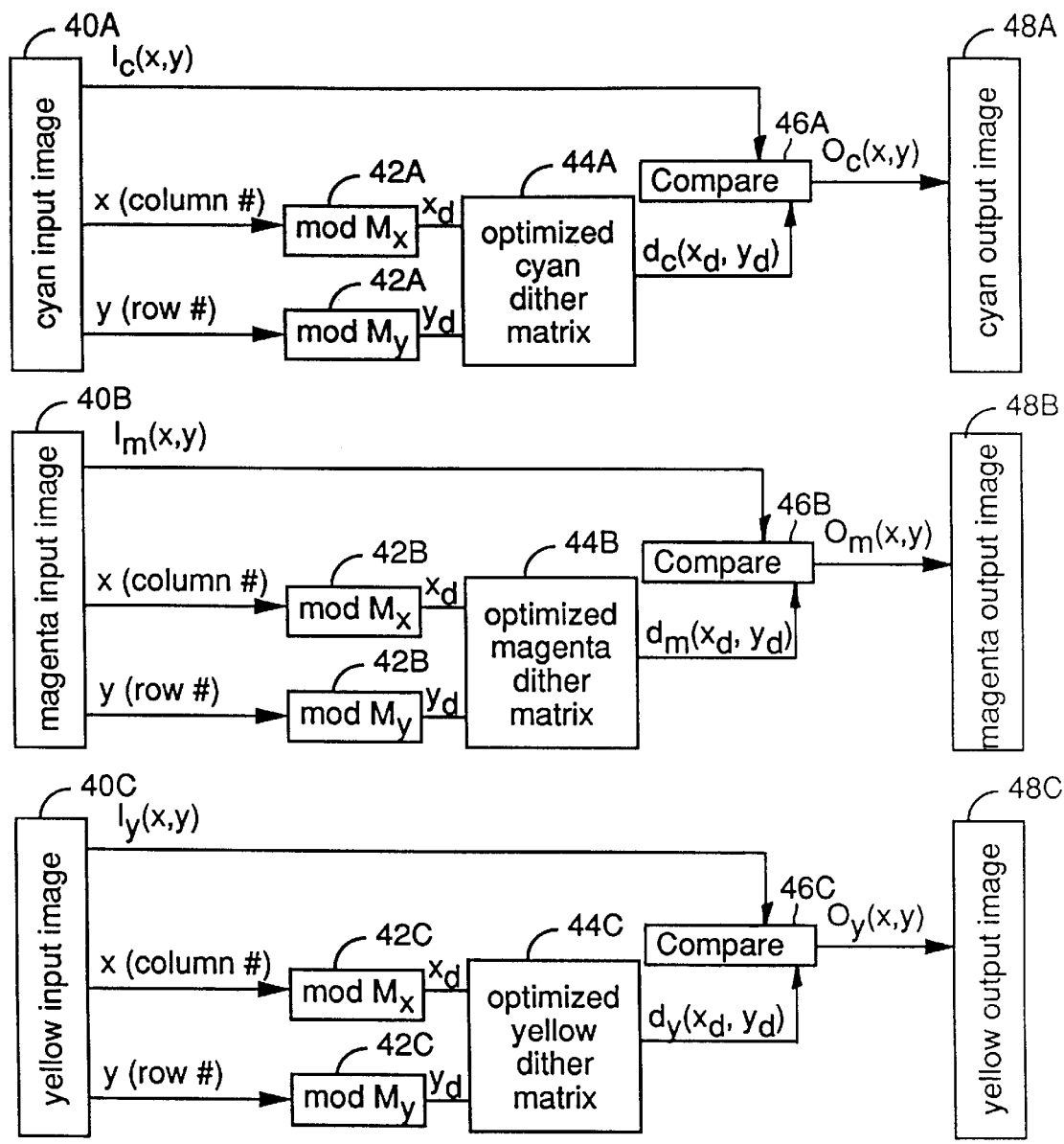
FIG. 4 is a schematic block diagram showing the halftoning technique of the present invention.

With reference to FIG. 4, one embodiment of this invention is shown where a multi-channel input color image having a cyan input image 40A, a magenta input image 40B, and a yellow input image 40C is processed to form a multi-channel output color image having a corresponding cyan output image 48A, magenta output image 48B, and yellow output image 48C. Modulo operators 42A, 42B, and 42C are used to determine the dither matrix column and row addresses $x_d$ and $y_d$, respectively for an input pixel having image column and row addresses x and y, respectively. The dither matrix column and row addresses are used to address jointly optimized dither matrices 44A, 44B, and 44C which are jointly optimized according to the present invention for the cyan, magenta and yellow color channels to determine cyan, magenta, and yellow dither values $d_c(x_d,y_d)$, $d_m(x_d,y_d)$, and $d_y(x_d,y_d)$, respectively. The addressed dither values are then compared to the input pixel values, $I_c(x,y)$, $I_m(x,y)$, and $I_y(x,y)$ for the corresponding color channels using comparators 46A, 46B, and 46C to determine the output pixel values $O_c(x,y)$, $O_m(x,y)$, and $O_y(x,y)$. If the input pixel value is larger than the addressed dither value, the comparator will turn the output pixel value to "on." Conversely, if the input pixel value is smaller than the addressed dither value, the comparator will turn the output pixel value to "off."

The method shown in FIG. 4, with the optimized dither matrices of the present invention can be implemented as a computer program product that includes a computer storage medium such as a computer readable magnetic or optical storage medium or a solid state storage device such as a programmable memory device or a custom integrated circuit and employed with a digital computer to drive a color output device. The computer program product may be included in a digital color output device, included in a driver for such device, or sold as a separate software product. A pseudo code implementation of such a computer program is shown in Table 1.

TABLE 1 for y = 1 to number of rows in image
for x = 1 to number of columns in image
{
 $x_d$ = x mod $M_x$
 $y_d$ = y mod $M_y$
 DC = $d_c(x_d, y_d)$
 DM = $d_m(x_d, y_d)$
 DY = $d_y(x_d, y_d)$
 if ($I_c(x,y)$<DC)
  $O_c(x,y)$ = 0
 else
  $O_c(x,y)$ = 1
 if ($I_m(X,Y)$<DM)
  $O_m(x,y)$ = 0
 else
  $O_m(x,y)$ = 1
 if ($I_y(x,y)$<DY)
  $O_y(x,y)$ = 0
 else
  $O_y(x,y)$ = 1
}

The jointly optimized dither matrices 44A, 44B, and 44C are designed so as to provide an output image having halftone patterns with minimum visibility to a human observer. In a preferred embodiment of the present invention, all of the color channels are used to jointly compute the visibility of the halftone patterns. However, in some cases it may be desirable to use only a subset of the color channels in the process of minimizing the visual cost. For example, the halftone patterns for the cyan and magenta color channels could be jointly optimized, while the halftone patterns for the yellow color channel, which will have a smaller contribution to the overall pattern visibility, could be determined independently.

In the preferred embodiment of this invention the halftone pattern visibility is minimized by determining the dither matrices that minimize the visible luminance modulation. This is frequently appropriate since the human visual system is more sensitive to luminance modulation than it is to chrominance modulation. However, it should be noted that the methods disclosed herein can easily be extended to include terms in the cost function which reflect the visibility of the chrominance modulation as well as the luminance modulation.

In order to design color halftone patterns that have minimum visibility to a human observer, it is first necessary to define a cost function for computing the visibility for a given set of halftone patterns. For the case where only the luminance component of the halftone pattern visibility is considered, the first step is to compute a spatial luminance distribution from the set of color halftone patterns. One method that can be used to determine the spatial luminance distribution is by measuring the luminance values that result when each of the individual colorants (e.g., cyan, magenta, and yellow) are used, as well as the luminance values that result for the possible combinations of the colorants (e.g., red=magenta+yellow, green=cyan+yellow, blue=cyan+magenta, and black=cyan+magenta+yellow). The halftone patterns for each of the color channels are then superimposed and the luminance value corresponding to the resulting combination of colorants are assigned to each of the pixel locations to determine the resulting spatial luminance distribution.

Another approach that can be used to determine the spatial luminance distribution $l(x,y)$ is to estimate it's value by computing a weighted sum of the individual halftone patterns $$l(x,y) = \sum_{i=1}^{N} w_i O_i(x,y) \qquad (1)$$

where $O_i(x,y)$ is the output image bitmap for the $i^{th}$ color channel, N is the number of color channels and $w_i$ is a weighting factor for each channel. The weighting factors will generally reflect the relative contributions of each channel to the luminance signal. Typically, yellow would have the smallest contribution, and magenta would have the largest contribution. An example of typical weights would be $w_c=0.3$, $w_m=0.6$, $w_y=0.1$ for the cyan, magenta and yellow channels respectively.

Once the luminance distribution $l(x,y)$ for a set of candidate halftone patterns has been computed, one method to compute the visibility of the luminance compute a lumino Fourier transform the luminance distribution to compute a luminance spectrum $L(f_x,f_y)$. The luminance spectrum is then weighted by the human visual system sensitivity as a function of spatial frequency $V(f_x,f_y)$ to compute a weighted luminance spectrum. A cost value, which is an estimate of the visibility of the halftone pattern, is then computed by integrating a function of the weighted luminance spectrum over all frequencies. One particular form of the cost function that can be used is:

$$\text{cost}_{cmy} = \iint |L_{CMY}(f_x,f_y) V(f_x,f_y)|^2 df_x df_y, \qquad (2)$$

where $L_{CMY}(f_x,f_y)$ is the luminance spectrum corresponding to the halftone pattern for a particular color value, CMY, and $\text{cost}_{CMY}$ is the resulting cost value computed for this color value. Since the luminance distribution is typically specified for a discrete set of pixel values, it is frequently useful to work with a discrete form of this cost function:

$$\text{cost}_{CMY} = \sum_{i=0}^{M_x-1} \sum_{j=0}^{M_y-1} |L_{CMY,ij} V_{ij}|^2, \qquad (3)$$

where $L_{CMY,ij}$ is the (i,j)th element of the discrete Fourier transionn of the luminance distribution for a particular CMY color value, and $V_{ij}$ is the human visual system sensitivity for the frequency corresponding to element (i,j).

One function that can be used to approximate the low-contrast photooptic human visual system sensitivity is:

$$V(f_x,f_y) = \begin{cases} a(b + c\tilde{f})\exp(-(c\tilde{f})^d) \\ 1.0 \end{cases} \qquad (4)$$

$$\tilde{f} > f_{max}$$
otherwise ;

where the constants a, b, c, and d are calculated from empirical data to be 2.2, 0.192, 0.114, and 1.1 respectively, f is the normalized radial spatial frequency in cycles/degree of visual subtense, and $f_{max}$ is the frequency at which the weighted exponential peaks. To account for variations in the human visual function sensitivity, the normalized radial spatial frequency is computed from the actual radial spatial frequency using an angular-dependent scale function:

$$\tilde{f} = \frac{f}{s(\theta)}, \qquad (5)$$

where:

$$f = \sqrt{f_x^2 + f_y^2}, \qquad (6)$$

and $s(\theta)$ is given by:

$$s(\theta) = \frac{1-w}{2} \cos(4\theta) + \frac{1+w}{2}, \qquad (7)$$

with w being a symmetry parameter, and $$\theta = \arctan\left(\frac{f_y}{f_x}\right). \qquad (8)$$

Other functional forms, such as a Gaussian approximation, can also be used to represent the human visual system sensitivity.

Often it is more convenient to compute the value of the cost in the spatial domain rather than transforming the luminance distribution to the frequency domain. In this case, by applying the well-known Parseval's Theorem to Eq. (1), it can be seen that the cost value can also be computed by $$\text{cost}_{CMY} = \iint |l_{CMY}(x,y) * v(x,y)|^2 dx dx, \qquad (9)$$

where * indicates the convolution operation, $l_{CMY}(x,y)$ is the luminance distribution for a particular color value, CMY, and $v(x,y)$ is the inverse Fourier transfonrm of the human visual system sensitivity and can be interpreted as the human visual system point spread function. The discrete form of this cost function is:

$$\text{cost}_{CMY} = \sum_{i=0}^{M_{x}-1} \sum_{j=0}^{M_{y}-1} |(l_{CMY} * v)_{ij}|^2 \quad (10)$$

where $(l_{CMY}*v)_{ij}$ is the (i,j)th element of the perceived luminance distribution given by discrete convolution of the luminance distribution for a particular CMY color value with the human visual function system point spread function. It should be noted that since the luminance distribution generated by an ordered dither process will be periodic, the discrete convolution must take this fact into account by including contributions from surrounding dither arrays.

There are a number of ways that the visual cost associated with the halftone patterns can be minimized. In one embodiment, the bit patterns for all of the pixel values are optimized simultaneously. In this case a total cost value is computed which is a combination of the individual cost values for a set of CMY color values. A non-linear optimization technique can then be used to determine the bit patterns that will produce the minimum total cost value.

One form of the total cost that can be used is a weighted sum of the individual cost values $$\text{cost}_{total} = \sum_{CMY} w_{CMY} \text{cost}_{CMY}, \quad (11)$$

where $w_{CMY}$ is a weighting factor, and the summation is computed over a certain set of CMY color values. The choice of the particular subset of CMY color values, as well as the weights assigned to each color value will determine the relative importance of various parts of color space during the optimization process.

For example, if the neutral colors are believed to be the most important color values for a particular printing application the set of CMY color values having equal amounts of cyan, magenta, and yellow can be included in the summation. If all of the neutral colors are equally important, then the weighting factors can be defined to normalize the individual cost values so that they have similar magnitudes. Other color values that can be included in the set of CMY color values are primary color series where one color channel is varied throughout it's range, and the other color channels are set to zero. CMY color values for particularly important colors such as skin-tones, sky colors and grass colors can also be included. Yet another set of CMY color values that could be used would be all of the possible combinations of the allowable color values for the different color channels.

In some cases it is desirable to use other formulas to compute the total cost from the set of individual cost values. For example, Eq. (11) can be modified to apply a power function to each of the individual cost function terms:

$$\text{cost}_{total} = \left[ \sum_{CMY} (w_{CMY} \text{cost}_{CMY})^p \right]^{1/p}, \quad (12)$$

where p is a positive constant. Typical values of p would be in the range of 1 to 10. Larger values of p have the effect of weighting larger individual cost values more heavily.

Figure 5:
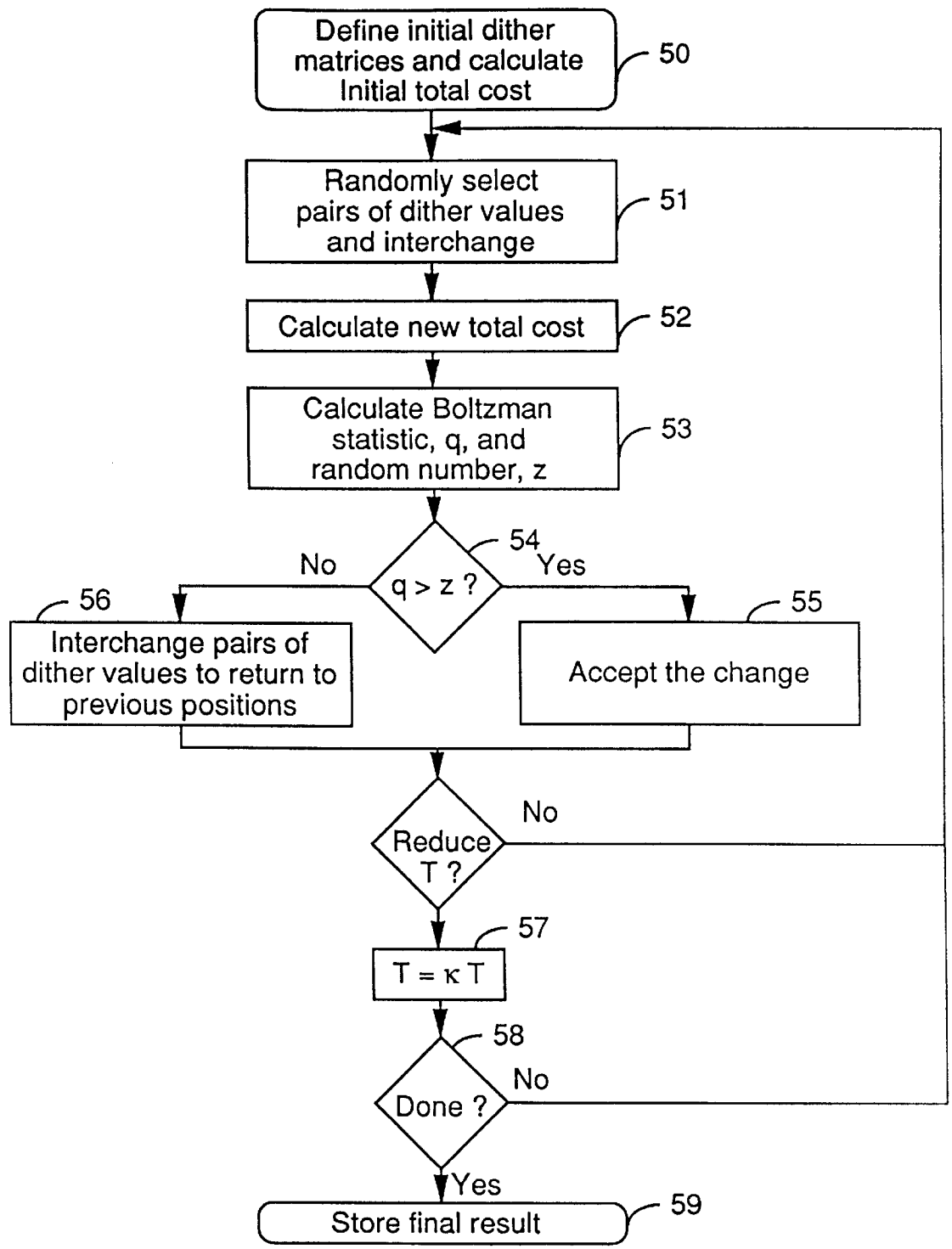
FIG. 5 is a flow chart illustrating a stochastic annealing technique employed with the present invention.

In general, since the number of possible arrangements of the dither values within the dither matrices is so large, it is not practical to calculate the cost for all of the variations to find the one that gives the smallest total cost value. There are a variety of optimization techniques that can be used to minimize the cost function. One well-known optimization technique that can be used to minimize the total cost is stochastic annealing. With reference to FIG. 5, the steps involved in one implementation of this algorithm will be described:

1. An initial set of dither matrices is defined, and a corresponding initial total cost value is calculated (50). One dither matrix will be associated with each color channel. The initial dither matrices can be formed randomly, or alternatively some other dither matrices can be used. The initial total cost will temporarily be known as the "old total cost."
2. Pairs of dither values in the dither matrices are randomly selected and interchanged to form a new set of dither matrices (51). In some cases, a single pair of dither values can be selected from one of the dither matrices. Alternatively, one or more pairs of dither values can be selected from each of the dither matrices.
3. A new total cost value is computed for the new set of dither matrices (52).
4. A Boltzman test statistic q, and a random number z between 0 and 1 are calculated (53), where q is given by:

$$q = \exp\left(-\frac{\Delta \text{cost}}{T}\right), \quad (13)$$

where $\Delta\text{cost}=(\text{new cost})-(\text{old cost})$, and the parameter T is set initially so that a large percentage, e.g. 80%, of new dither matrices will be accepted in the following step, even if $\Delta\text{cost}>0$.

5. The value of q is then compared to z (54). If q>z the new dither matrices are kept (55) and the new total cost computed in step 3 is renamed as the old total cost. If $q \leq z$, the dither matrices are returned to their previous states (56).
6. After many iteration of steps 2–5 above, e.g., 1000, reduce the parameter T to $\kappa T$ (57), where $\kappa<1$, e.g. $\kappa=0.95$.
7. When T is sufficiently small so that the total costs at successive values of T are no longer changing significantly, or after a fixed number of changes have been made to T, e.g., 500, the process is done (58) and the final dither matrices are stored in a memory (59).

Other types of combinatorial optimization techniques such as those referred to as genetic algorithms can also be used to determine the optimum dither matrices. For a generic description of these algorithms see Gavid E. Goldberg, *Genetic Algorithms in Search, Optimization, and Machine Learning*, Addison-Wesley Publishing Company, Inc., 1989, and Gregory J. E. Rawlings, *Foundations of Genetic Algorithms*, Morgan Kaufmann Publishers, 1991.

In a preferred embodiment of the present invention, the halftone patterns for each input level are determined sequentially rather than simultaneously. In this case, a halftone pattern for a first input level is initially determined, and then halftone patterns for the remaining input levels are determined one-by-one. The remaining patterns may be determined using a consecutive sequence, or using other types of sequences. For example, consider the case where the first input level that is initially determined is level 128 (out of 256 possible input levels). A consecutive sequence could be used where the input levels were optimized in the following order: 127, 126, . . ., 1, 0, 129, 130, . . . , 254, 255. Alternatively, many other sequences are possible such as a sequence based on a binary tree: 64, 192, 32, 96, 140, 224, . . .

Since the present invention deals with jointly optimized matrices to be applied to each channel of a color image, it is necessary to determine halftone patterns for each color channel at every input level. In one embodiment of the present invention, the halftone patterns for each color channel at a given input level are optimized simultaneously. However, other arrangements are also possible. For example, the cyan halftone pattern for a certain input level can be determined, and then the magenta and yellow halftone patterns for that input level can be computed in turn. When the halftone patterns for each of the color channels has been determined for that level, the next level can then be considered. Alternatively, the halftone patterns for each of the input levels for one color channel can be determined first. When the halftone patterns for the first color channel have all been determined, the remaining color channels can be optimized sequentially.

Figure 6:
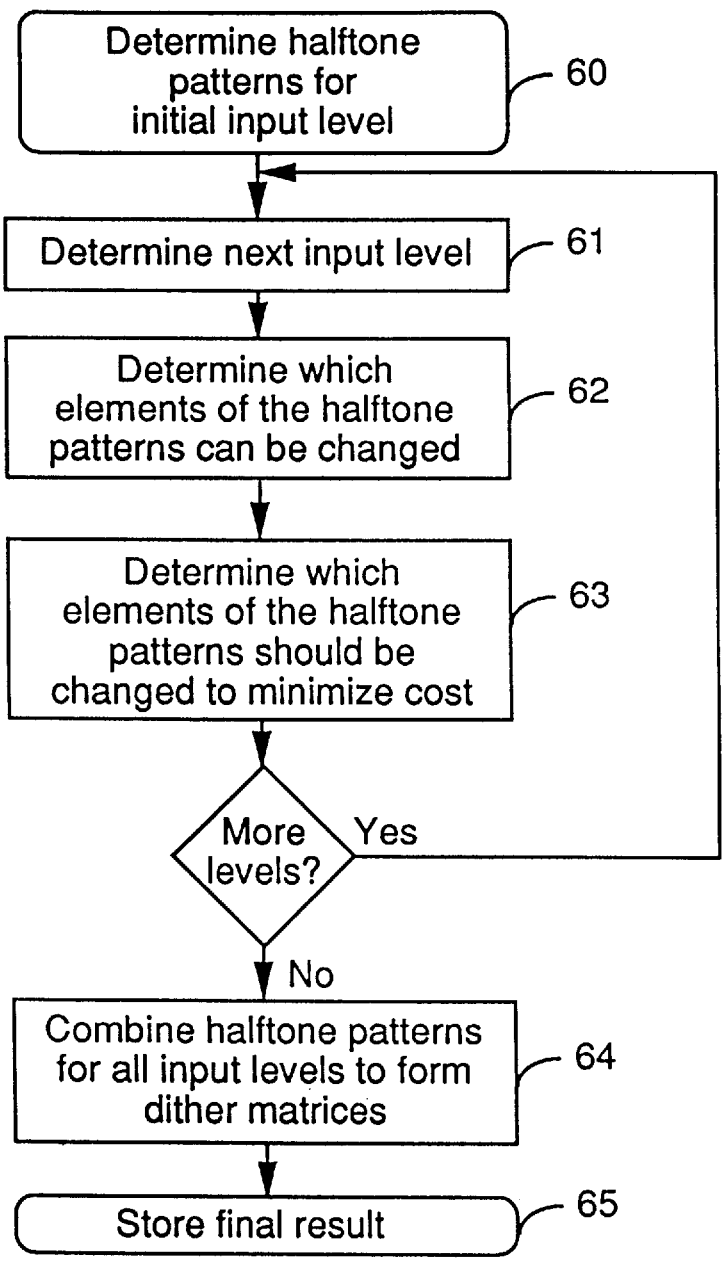
FIG. 6 is a flow chart showing one method for implementing a sequential halftone pattern optimization technique.

When the halftone patterns for each input level are optimized sequentially rather than simultaneously, the optimization procedure must be modified slightly. In this case, it is usually more convenient to specify the intermediate results by the halftone patterns corresponding to each input level, rather than the dither matrix that would be used to generate the halftone patterns. After all of the halftone patterns have been optimized, the resulting halftone patterns can then be converted into the equivalent dither matrix. A flowchart showing one method for implementing the sequential halftone pattern optimization approach is shown in FIG. 6. The basic steps of this method are:

1. Determine halftone patterns for an initial input level (60).
2. Determine the next input level in the sequence that is to be optimized (61). As mentioned above many different sequences can be used such as consecutive sequences or binary tree sequences.
3. Determine which elements of the halftone patterns can be changed (62). Generally this is done by finding the pixels which are "off" in the halftone pattern corresponding to the nearest input level below the current input level that has already been optimized, and are "on" in the halftone pattern corresponding to the nearest input level above the current input level that has already been optimized.
4. Determine which changeable elements should be changed in order to minimize the visual cost (63). This will produce halftone patterns having the minimum visibility as defined by the visual cost function.
5. Repeat steps 2–4 for each of the input levels for each of the color channels.
6. Combine the resulting halftone patterns for each level into the corresponding dither matrix for each color channel (64).
7. Store the final dither matrices into a digital memory (65).

The step of determining halftone patterns for an initial input level (60) can be performed in several ways. In one embodiment of this invention, a first set of halftone patterns is randomly formed. The halftone patterns are then optimized using a stochastic annealing procedure analogous to that shown in FIG. 5. The only differences being that elements of the halftone patterns are interchanged instead of elements of a dither matrix, and that the cost for a single color value is computed rather than a total cost which combines costs from a set of color values.

In the preferred embodiment of this invention, the initial halftone patterns are formed from monochrome dither matrices designed to produce minimum visibility halftone patterns using prior art methods such as those referred to above. One method for forming the initial halftone patterns is shown here in pseudo-code:

```
for channel = 0 to num_channels
    for each i, j
    {
        if ((d(i,j)>=channel*level) and (d(i,j)<(channel+1)*level))
            pattern_channel(i,j) = 1
        else
            pattern_channel(i,j) = 0
    }
``` where num_channels is the number of color channels, i and j are array index values, d( ) is the monochrome dither matrix, pattern$_{channel}$( ) is the initial halftone pattern for a color channel, and level is the input level for the initial halftone pattern. It should be noted that the input level for the initial halftone pattern must be less than or equal to the number of levels in the monochrome dither matrix divided by the number of color channels. For a monochrome dither matrix having 256 different levels, and a system having three color channels this will limit the input level to be less than or equal to 85.

If the initial halftone patterns are formed using this approach, the resulting patterns will be non-overlapping, and will reflect the basic spatial frequency distribution characteristics of the monochrome dither matrix. Both of these characteristics are desirable, but the resulting patterns may not be optimum relative to the global minimum of the cost function. For this reason, it may be desirable to form patterns using this method, and then use these patterns as initial patterns for an optimization method such as the stochastic annealing method described above.

There are several ways to perform the step of determining which changeable elements should be changed in order to minimize the visual cost (63). In one embodiment of this invention, a stochastic annealing process is used analogous to that shown in FIG. 5. The only difference being that elements of the halftone patterns that were found to be changeable (62) are interchanged instead of elements of a dither matrix. The cost value can be computed from a single color value (typically a neutral color value corresponding to the input value currently being optimized), or can be a combination of cost values for a set of color values. Using a combination of cost values insures that the visibility of the halftone patterns generated for color values in one part of color space is not optimized at the expense of other parts of color space. One combination of cost values which has been found to be useful is to compute a weighted average of the cost value for the neutral color value, and cost values for one or more of the color channels individually. For example, if the bitmap for the cyan channel for input value 100 were being optimized, the combined cost value can be a weighted average of the cost for the neutral color where cyan, magenta, and yellow all have a value of 100, with the cost for the color where cyan has a value of 100, and magenta and yellow are zero. Obviously, other colors could be included in the combined cost value as well.

Other optimization techniques such as genetic algorithms, or the projection on convex sets type of algorithms used by Parker et al. can also be used to determine the minimum visibility halftone patterns. When large dither matrices are being optimized many of these techniques have been found to take a large amount of processing time to complete even with very powerful computers. For this reason, it is sometimes desirable to use other optimization techniques that will converge more quickly, even if the final solution is slightly less optimal than could be found with the slower techniques.

One such rapidly converging technique involves defining a new form of cost function. Consider a luminance distribution $l_{CMY}(x,y)$ computed using the methods above for the optimum halftone patterns for a particular input value. The perceived luminance distribution can be computed by convolving the luminance distribution with an approximation of the point spread function of the human visual system, $l_{CMY}(x,y)*v(x,y)$. If it is now desired to determine the optimum halftone patterns for the next input value in the sequence, it will be necessary to add (or subtract) an appropriate number of dots from the halftone pattern. These dots can be added/subtracted using the optimization processes discussed above. With these optimization processes, the dots will typically be added to pixel locations where the perceived luminance distribution is high, or conversely will be subtracted from pixel locations where the perceived luminance distribution is low. It is therefore possible to achieve approximately the same result by adding pixels at the pixel locations having the maximum perceived luminance value, or subtracting pixels at the pixel locations having the minimum perceived luminance value. If more than one dot needs to be added or subtracted, the dots should generally be added/subtracted one at a time and the perceived luminance distribution recomputed after each step. This process is essentially equivalent to defining a new cost function that penalizes large peaks and valleys in the perceived luminance distribution.

This approach can also be extended to include contributions from the perceived luminance distributions for other colors in addition to the neutral colors. One way to do this is to compute a combined perceived luminance distribution.

$$l_p(x,y) = \sum_{CMY} w_{CMY} l_{p,CMY}(x,y), \quad (14)$$

where $w_{CMY}$ is a weighting factor, $l_{p,CMY}(x,y)=l_{CMY}(x,y)*v(x,y)$ is the preceived luminance distribution for a certain CMY color value, and the summation is computed over a set of CMY color values. Once the combined perceived luminance distribution is computed, dots can be added/subtracted by finding the respective minimum or maximum.

Other types of cost functions can also be defined which include terms relating to the visibility of the chrominance modulation in addition to terms relating to the visibility of the luminance modulation. These types of cost functions can be used to more accurately reflect the overall halftone pattern visibility. However, in many cases the improvement in the final results do not justify the added complexity in the optimization process.

It will be obvious to one skilled in the art that there are many variations of the above disclosed embodiments that could be used to produce approximately equivalent results. In particular, there are many variations of cost functions that could be defined that penalize halftone patterns that are more visible to the human observer. Additionally, there are many different types of optimization techniques that can be employed to minimize the given cost functions. Further, even within the particular embodiments that we have discussed there are countless variations in the details such as the order that the halftone patterns are optimized.

Analogous to the monochrome halftoning examples described above, there a number of different methods that can be used to process images using the jointly optimized halftone patterns. One method was shown in FIG. 4. where the halftone patterns are combined into a set of jointly optimized dither matrices 44A–C which are used to threshold the input image values.

Figure 7:
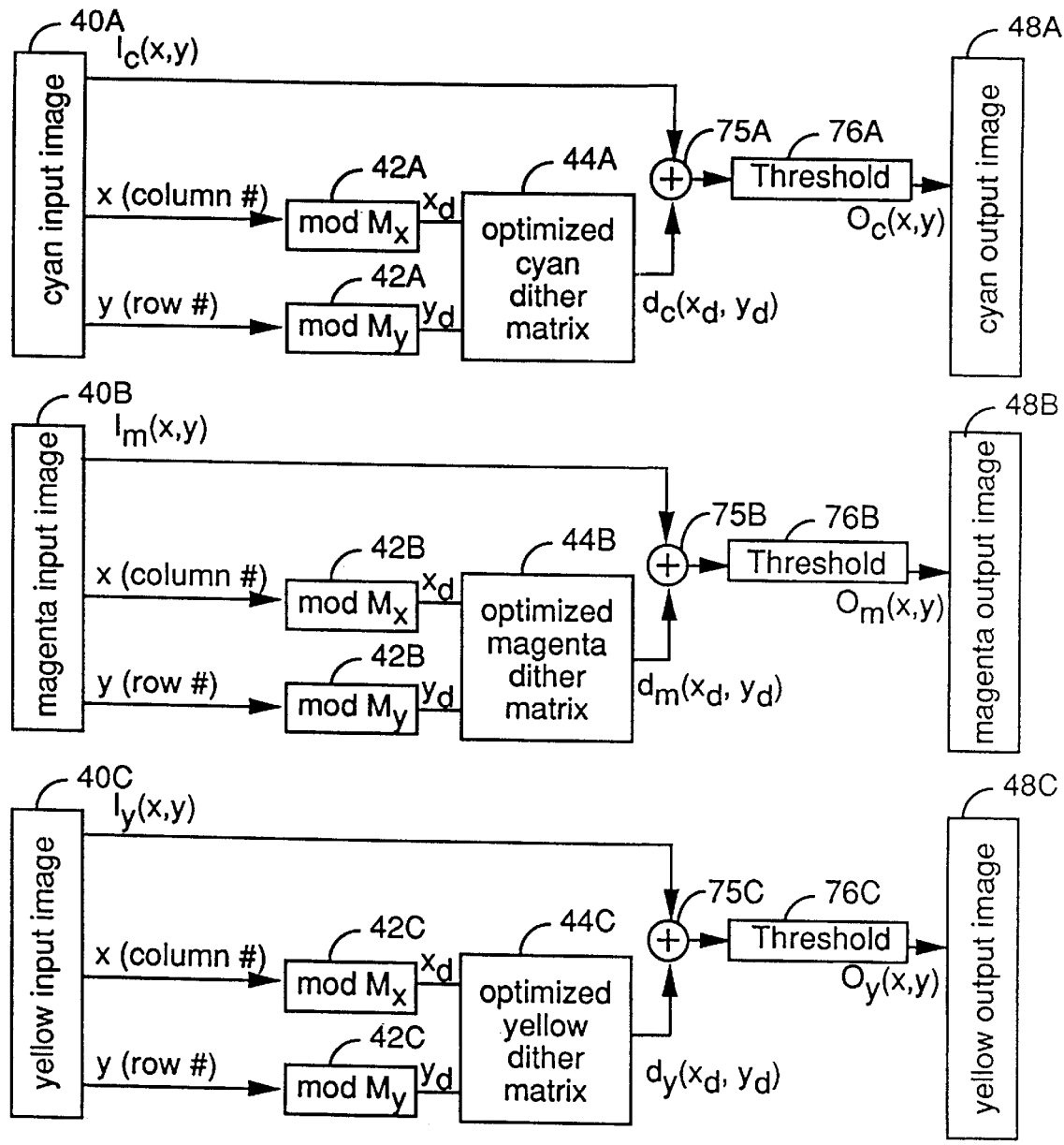
FIG. 7 is a schematic block diagram illustrating an alternative technique of halftoning an image according to the present invention.

A second way to apply the jointly optimized dither matrices to a color image is shown in FIG. 7. In this case the dither values $d_c(x_d,y_d)$, $d_m(x_d,y_d)$, and $d_y(x_d,y_d)$ are combined with the input pixel values $I_c(x,y)$, $I_m(x,y)$, and $I_y(x,y)$ using adders 75A–C. Threshold operators 76A–C are then used to threshold the combined values to determine the output pixel values $O_c(x,y)$, $O_m(x,y)$, and $O_y(x,y)$.

Figure 8:
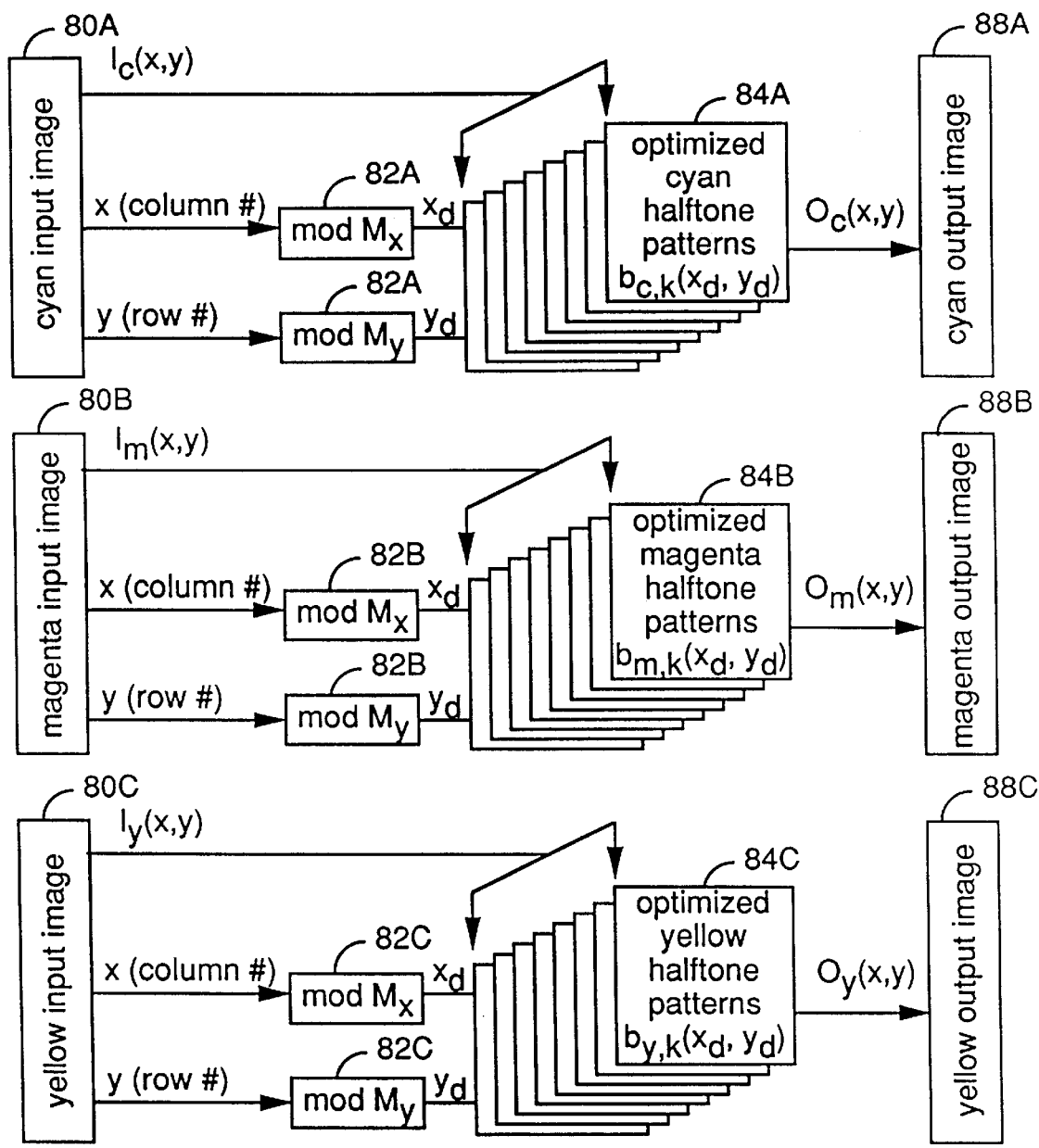
FIG. 8 is a schematic block diagram illustrating a further alternative technique of halftoning an image according to the present invention.

Yet another implementation of this basic technique is shown in FIG. 8. In this case, the jointly optimized halftone patterns are not combined to form jointly optimized dither matrices. Instead they are directly stored in a digital memory for use in halftoning the color channels of an input color image 80A–C. The input pixel values $I_c(x,y)$, $I_m(x,y)$, and $I_y(x,y)$ are then used to select which of the jointly optimized halftone patterns 84A–C should be used for each color channel and for each pixel. Modulo operators 82A–C are used to determine indices $x_d$ and $y_d$ that are used to address the selected dither bitmaps to determine the output pixel values $O_c(x,y)$, $O_m(x,y)$, and $O_y(x,y)$ for each color channel of the color output image 88A–C. This implementation has the advantage that fewer computations are necessary to process each pixel, at the expense of a larger memory requirement for the storage of the dither patterns.

The optimization methods discussed above assume that the output device that is used to produce images with the optimized halftone patterns will produce ideal images with perfectly registered non-overlapping dots. For many devices, this assumption may be sufficiently close to reality that the resulting halftone patterns are near-optimum. In other devices, the failure to accurately model the characteristics of the output image can result in sub-optimal performance since the computed cost value associated with the visibility of the halftone patterns may be inaccurate. To correct this deficiency, the above methods can be modified to more accurately reflect the actual device characteristics during the step of calculating the visibility of the halftone patterns. The cost function can be modified in a number of ways to more accurately reflect the visibility of the halftone patterns.

Figure 9A:
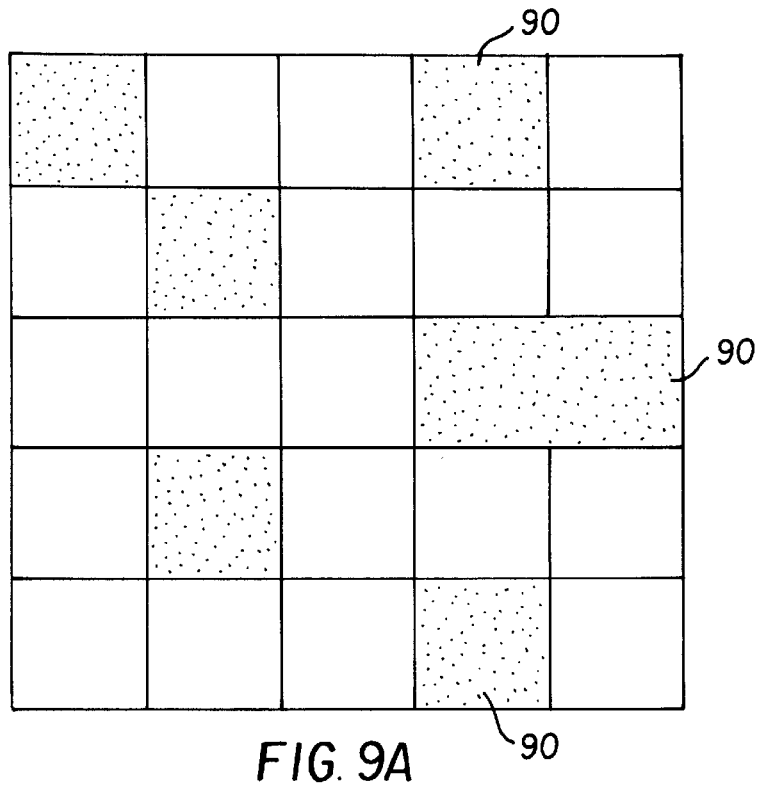
FIG. 9A & B illustrate the difference between a real and an ideal halftone dot pattern.
Figure 9B:
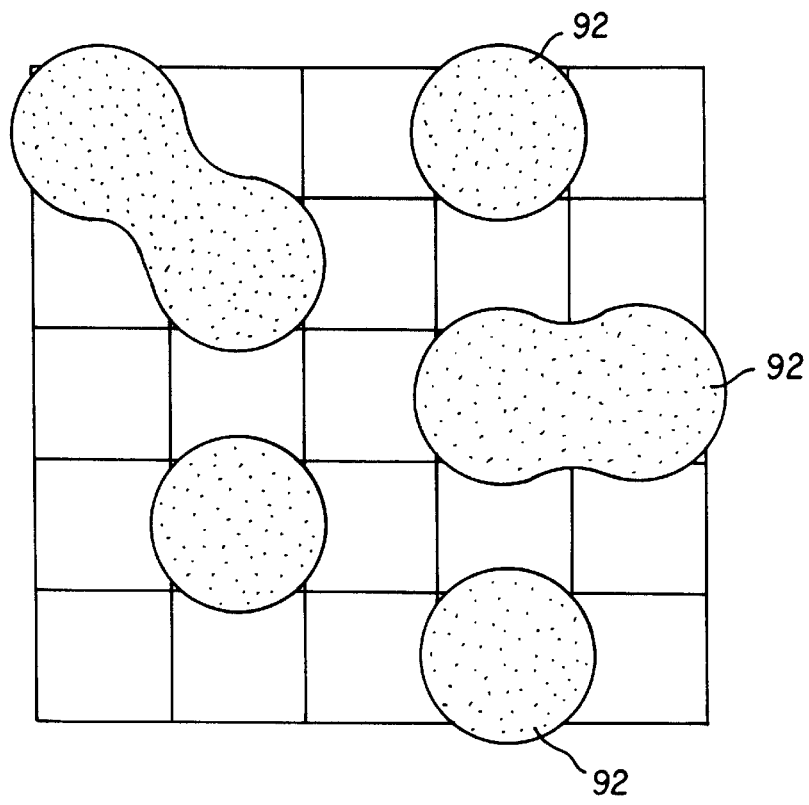

One example of a more accurate cost function is to use more sophisticated halftone dot models to account for the actual dot shapes/sizes and/or the interactions between nearby dots. In this case, the luminance distribution that is computed during the cost calculation would more accurately reflect the actual dot pattern created on the output device. For example, FIGS. 9A and B illustrates the difference between an ideal dot pattern (FIG. 9A) wherein the ideal dots 90 are non-overlapping; and a realistic dot pattern (FIG. 9B) more accurately reflecting the device characteristics for an output device wherein the dots 92 overlap and interact. The most accurate device models will account for the dot interactions within a color channel, as well as between color channels.

Another example of a physical device characteristic that can influence the visibility of the halftone patterns is the dot placement accuracy of the output device. If the visibility of the halftone patterns is minimized with respect to perfectly registered patterns, the optimization process will tend to avoid putting different color dots on top of each other unless absolutely necessary. However, if one of the color channels is now misregistered with respect to the others, this will cause many of the dots to overlap. In fact, the number of dots that overlap may actually be higher than the number of dots that would have overlapped had the halftone patterns for each channel been determined independently. In some cases, this will actually result in halftone patterns that have a higher visibility. In this event, to determine halftone patterns that have the minimum visibility, it is necessary to incorporate a model that accounts for the dot placement statistics into the calculation of the cost function. There are a number of ways that this could be done. In one embodiment of this invention, an average visual cost value is calculated by combining a set of visual cost values corresponding to a number of variations of dot placement errors. The variations of dot placements being chosen to reflect the expected dot placement statistics for the specific output device. For example, if the dot placement within a color channel is very accurate, but the registration of the color channels with each other varies according to some known distribution, a set of perceived luminance distributions can be calculated using a set of registration errors selected from the known distribution. The average visual cost value can then be computed by averaging visual cost values associated with each of the set of perceived luminance distributions:

$$\overline{cost_{CMY}} = \frac{1}{N_r} \sum_{r=1}^{N_r} cost_{CMY,r}, \quad (15)$$

where $N_r$ is the number of registration variations in the set, and $cost_{CMY,r}$ is the cost associated with a particular registration variation.

The method of the present invention can also be extended to color output devices that have more than two output levels for some or all of the color channels. Such output devices are frequently referred to as multi-level output devices. Frequently, the number of output levels that the multi-level output devices can produce are less than the number of output levels that would be required to produce images that are continuous tone in appearance. For example, an ink jet printer may be adapted to produce one of 3 different dot sizes for each color channel for any given pixel. Similarly, a video display may be configured to produce one of 8 different red and green intensity levels, and one of 4 different blue intensity levels at any given pixel location. Algorithms that are designed to process continuous tone images for display on such devices in such a way that the average intensity level is preserved over a local region of the image are generally referred to as multi-level halftoning methods, or sometimes multi-toning methods.

Figure 10:
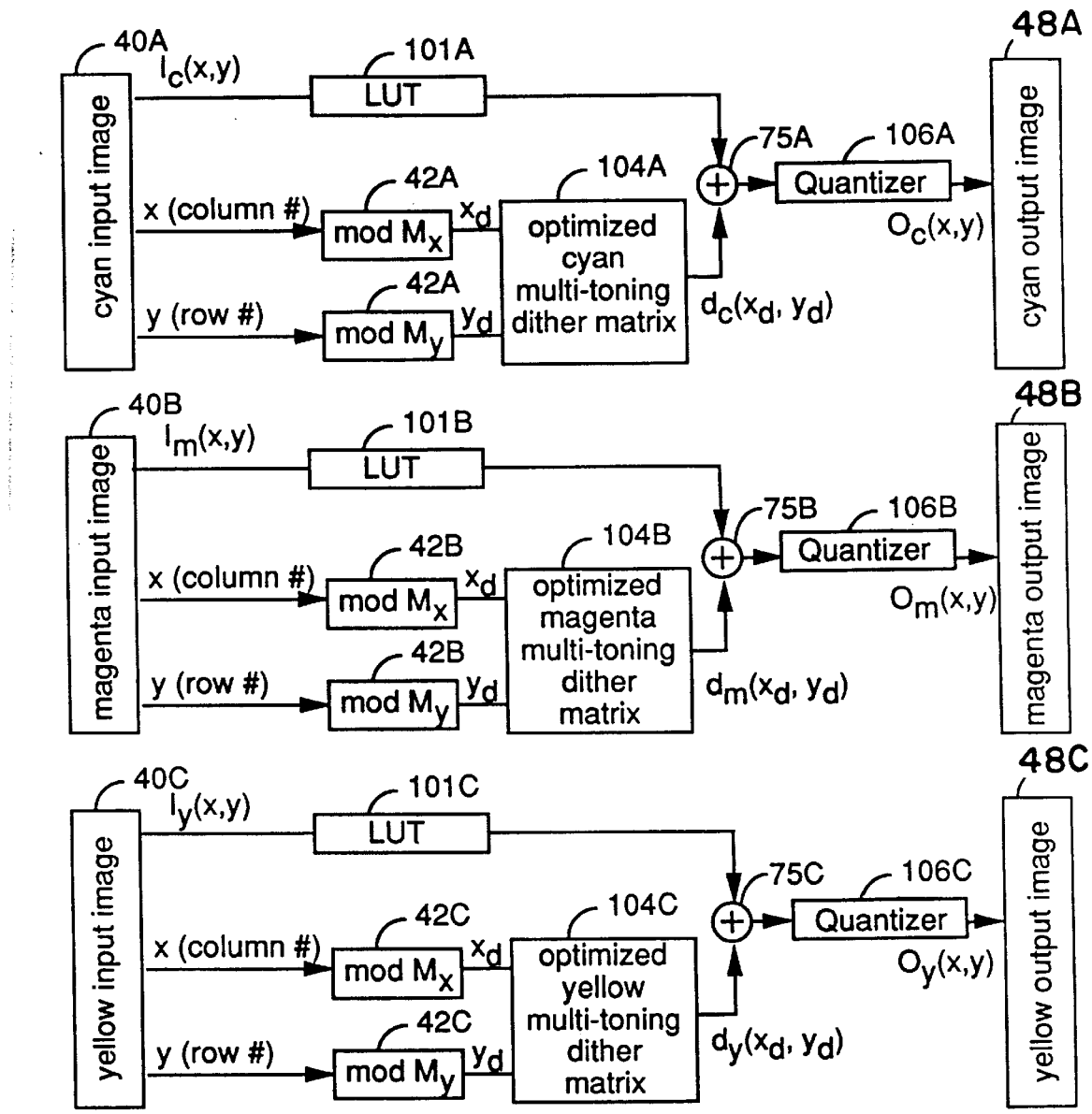
FIG. 10 is a schematic block diagram illustrating a multi-level halftoning technique according to the present invention.

One common type of multi-level halftoning method is multi-level dither. Spaulding and Ray (see U.S. patent application Ser. No. 08/331,246, entitled "Method and Apparatus for Generating a Halftone Pattern for a Multi-Level Output Device") have disclosed a multi-level dither method for monochrome images that produces halftoning patterns having minimum visibility to a human observer. This approach can be extended to multi-level color output devices in a manner analogous to that described above for binary color output devices. FIG. 10 illustrates one preferred embodiment of a multi-level halftoning method according to the present invention. It can be seen that this method is very similar to that shown in FIG. 7 except that the threshold operators 76A–C have been replaced by quantizers 106A–C, and the jointly optimized dither matrices 44A–C have been replaced by jointly optimized multi-toning dither matrices 104A–C. The quantizers map modified input values within specified quantization intervals to corresponding output values. In the preferred embodiment. the quantizers are implemented as quantization look-up tables. Other forms of quantizers that could be used include division operators, and binary bit-shift operators In some cases it may also be desirable to include optional look-up tables (LUTs) 101A–C that are applied to the input pixel values, $I_c(x,y)$, $I_m(x,y)$, and $I_y(x,y,)$. The LUTs can be used to shape the tonescale of the printing process, and additionally to scale the magnitude of the input values so that they are compatible with the magnitude of the values stored in the optimized multi-toning dither matrices. In the preferred embodiment of this invention, the magnitude of the input pixel values and the dither matrix values are scaled so that the range of dither matrix values is equal to the size of the quantization intervals. This will ensure that the modulation associated with the resulting multi-level halftone patterns has the minimum possible amplitude.

Depending on the number of output levels and the scaling of the input values and the dither values, the jointly optimized multi-toning dither matrices 104A–C can be identical to the jointly optimized dither matrices 44A–C shown in FIG. 7, or can simply be a scaled version of those matrices. Alternately, jointly optimized multi-toning dither matrices can be computed particularly for the multi-level configuration. In this case, the methods described above for computing jointly optimized dither matrices can be directly applied to this case, except that the luminance distributions are computed from the multi-level halftone patterns instead of binary halftone patterns.

Figure 11:
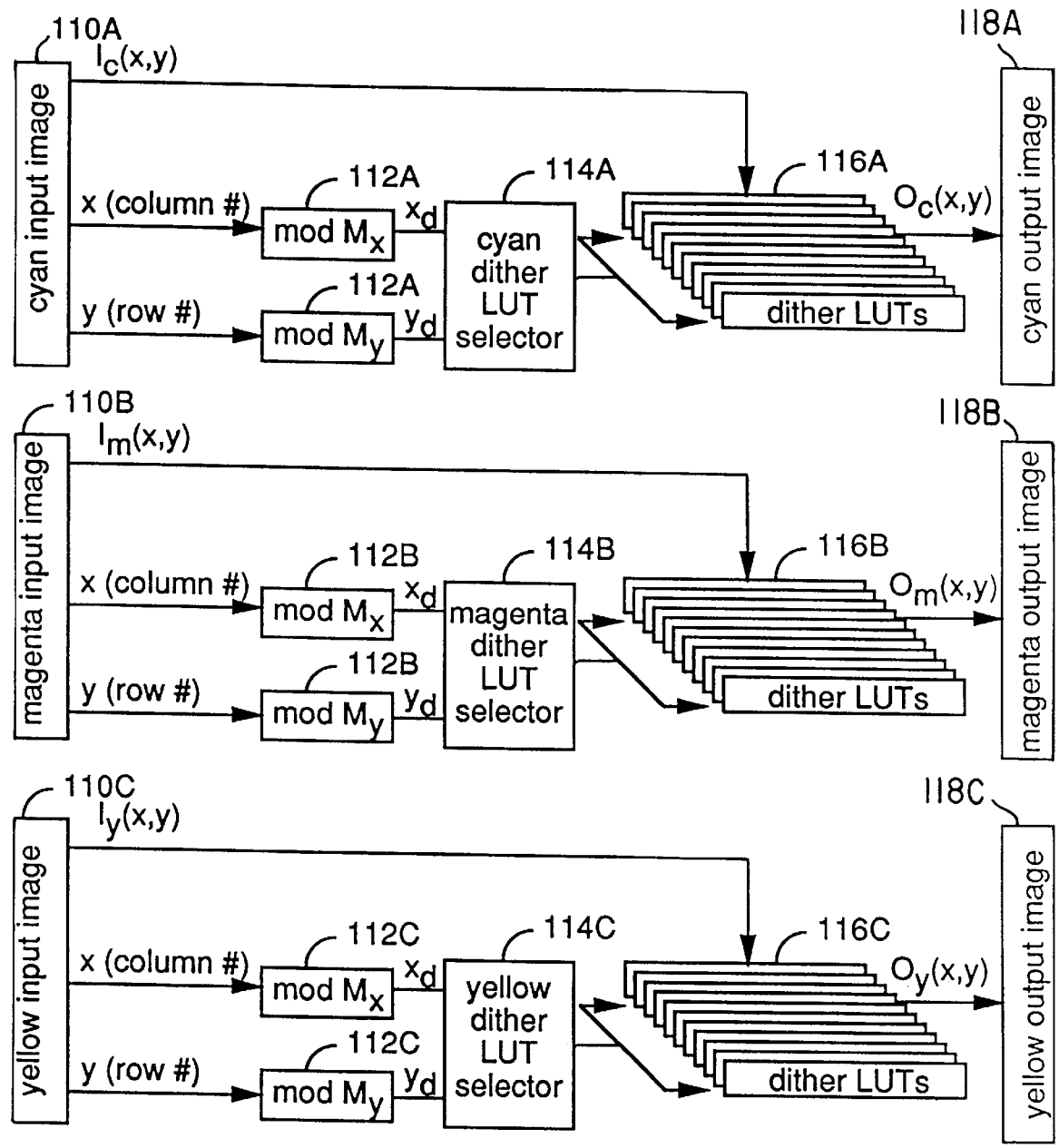
FIG. 11 is a schematic block diagram illustrating an alternative multi-level halftoning technique according to the present invention.

As in the case of the binary output device, the optimized dither patterns can be applied to the image using a variety of methods. For example, another configuration that can be used is shown in FIG. 11. The basic processing method for a single color channel is analogous to that described by Miller (U.S. Pat. No. 5,291,311) for use with monochrome image data. In this case, the method is independently applied to each color channel, and the dither patterns that are applied are jointly designed to minimize the visibility of the multi-level halftoning patterns to a human observer. With reference to FIG. 11, a multi-channel input color image having a cyan input image 110A, a magenta input image 110B, and a yellow input image 110C is processed to form a multi-channel output color image having a corresponding cyan output image 118A, magenta output image 118B, and yellow output image 118C. Modulo operators 112A–C are used to determine the dither LUT selector column and row addresses $x_d$ and $y_d$, respectively for an input pixel having image column and row addresses x and y, respectively. The dither LUT selector column and row addresses are used to address dither LUT selectors 114A–C for the cyan, magenta and yellow color channels to select one of a set of jointly optimized dither LUTs 116A–C for each color channel. One dither LUT is stored for each location in an $M_x \times M_y$ dither cell for each color channel. The input pixel values, $I_c(x,y)$, $I_m(x,y)$, and $I_y(x,y)$ for each of the color channels is used to address the selected dither LUT for the corresponding color channel to determine the output pixel values $O_c(x,y)$, $O_m(x,y)$, and $O_y(x,y)$. This process is repeated for each pixel in the color input image. In one embodiment, the dither LUTs can be populated so as to give identical results to the configuration shown in FIG. 10. In this case, the method shown in FIG. 11 has the advantage that fewer computations are required relative to the configuration shown in FIG. 10, at the expense of larger memory requirements for the storage of the jointly optimized dither LUTs. However, it can be seen that the method of FIG. 11 is actually more flexible so that by properly designing the jointly optimized dither LUTs it is possible to generate multi-level halftone patterns that could not be generated using the method of FIG. 10.

The invention has been described with reference to a preferred embodiment. However, it will be appreciated that variations and modifications can be effected by a person of ordinary skill in the art without departing from the scope of the invention.

We claim:

1. A method for halftoning a multi-channel digital color image having an x,y array of color pixel values, comprising the steps of:

a. providing a matrix of dither values for each color channel of the digital color image wherein two or more of the matrices of dither values are designed jointly to minimize a visual cost function;

b. for each color channel modularly addressing the matrix of dither values with the location of a pixel in the digital color image to obtain an addressed dither value;

c. comparing the addressed dither value for each color channel with the pixel value for the corresponding color channel to determine an output halftone image value for each color channel; and d. repeating steps b and c for each pixel in the digital color image.

2. The method of claim 1 where the visual cost function is a visual luminance cost function.

3. The method of claim 2 where the visual luminance cost function is computed from a spatial luminance distribution that results from combining the halftone patterns for a given input color value.

4. The method of claim 3 where the luminance distribution for a given input color value is determined by forming a weighted sum of the halftone patterns for each color channel.

5. The method of claim 1 where the visual cost function comprises a combination of a visual luminance cost function and a visual cost function for a single color channel.

6. The method of claim 1 where the visual cost function comprises a combination of a visual luminance cost function and a visual chrominance cost function.

7. The method of claim 1 where the visual cost function is a combination of visual costs for a plurality of input color values.

8. The method of claim 1 where the visual cost function comprises a combination of frequency components of a luminance spectrum computed from the luminance distribution where the frequency components have been weighted by a human visual system sensitivity function.

9. The method of claim 8 where the combination of frequency components of a luminance spectrum is given by:

$$\text{cost}_{CMY} = \sum_{i=0}^{M_x-1} \sum_{j=0}^{M_y-1} |L_{CMY,ij} V_{i,j}|^2$$

where $L_{CMY,ij}$ is the (i,j)th element of the luminance spectrum for a particular CMY color value, and $V_{ij}$ is the human visual system sensitivity for the frequency corresponding to element (ij).

10. The method of claim 1 where the visual cost function is minimized by a stochastic annealing process.

11. The method of claim 1 where the visual cost function is minimized by a genetic algorithm.

12. The method of claim 1 where the visual cost is jointly minimized for each color value in a sequence of color values.

13. The method of claim 1 where the visual cost is jointly minimized by determining which of a set of candidate pixels in the halftone pattern for a certain color level can be changed to produce a smallest visual cost value.

14. The method of claim 1 where the color channels are RGB.

15. The method of claim 1 where the color channels are CMY.

16. The method of claim 1 where the color channels are CMYK.

17. The method of claim 1 where the visual cost function incorporates a dot reproduction model for an output device intended to be used to print the output halftone image.

18. The method of claim 1 where the visual cost function incorporates a registration error model for an output device intended to be used to print the output halftone image.

19. A method for halftoning a multi-channel digital color image having an x,y array of color pixel values, comprising the steps of:

a. providing a matrix of dither values for each color channel of the digital color image wherein two or more of the matrices of dither values are designed jointly to minimize a visual cost function;

b. for each color channel modularly addressing the matrix of dither values with the location of a pixel in the digital color image to obtain an addressed dither value;

c. adding the addressed dither value for each color channel to the pixel value for the corresponding color channel to compute a modified pixel value for each color channel d. comparing the modified pixel value for each color channel to a threshold value to determine an output halftone image value for each color channel; and e. repeating steps b through d for each pixel in the digital color image.

20. The method of claim 19 where the visual cost function is a visual luminance cost function.

21. The method of claim 20 where the visual luminance cost function is computed from a spatial luminance distribution that results from combining the halftone patterns for a given input color value.

22. The method of claim 21 where the luminance distribution for a given input color value is determined by forming a weighted sum of the halftone patterns for each color channel.

23. The method of claim 19 where the visual cost function comprises a combination of a visual luminance cost function and a visual cost function for a single color channel.

24. The method of claim 19 where the visual cost function comprises a combination of a visual luminance cost function and a visual chrominance cost function.

25. The method of claim 19 where the visual cost function is a combination of visual costs for a plurality of input color values.

26. The method of claim 19 where the visual cost function comprises a combination of frequency components of a luminance spectrum computed from the luminance distribution where the frequency components have been weighted by a human visual system sensitivity function.

27. The method of claim 19 where the visual cost function incorporates a dot reproduction model for an output device intended to be used to print the output halftone image.

28. The method of claim 19 where the visual cost function incorporates a registration error model for an output device intended to be used to print the output halftone image.

29. A method for halftoning a multi-channel digital color image having an x,y array of color pixel values, comprising the steps of:

a. providing a dither bitmap for each pixel value of each color channel of the digital color image where the dither bitmaps for two or more of the color channels are designed jointly to minimize a visual cost function;

b. for each color channel selecting the dither bitmap corresponding to the pixel value for a pixel in the digital image;

c. for each color channel modularly addressing the selected dither bitmap with the location of the pixel to obtain an output halftone image value; and d. repeating step b and c for each pixel in the digital image.

30. The method of claim 29 where the visual cost function is a visual luminance cost function.

31. The method of claim 30 where the visual luminance cost function is computed from a spatial luminance distribution that results from combining the halftone patterns for a given input color value.

32. The method of claim 31 where the luminance distribution for a given input color value is determined by forming a weighted sum of the halftone patterns for each color channel.

33. The method of claim 29 where the visual cost function comprises a combination of a visual luminance cost function and a visual cost function for a single color channel.

34. The method of claim 29 where the visual cost function comprises a combination of a visual luminance cost function and a visual chrominance cost function.

35. The method of claim 29 where the visual cost function is a combination of visual costs for a plurality of input color values.

36. The method of claim 29 where the visual cost function comprises a combination of frequency components of a luminance spectrum computed from the luminance distribution where the frequency components have been weighted by a human visual system sensitivity function.

37. The method of claim 29 where the visual cost function incorporates a dot reproduction model for an output device intended to be used to print the output halftone image.

38. The method of claim 29 where the visual cost function incorporates a registration error model for an output device intended to be used to print the output halftone image.

39. A computer program product, comprising: a computer readable storage means having stored thereon a computer program including:
   a. sets of halftone patterns for each color channel of a digital color image wherein two or more of the sets of halftone patterns are designed jointly to minimize a visual cost function;
   b. means for modularly addressing the sets of halftone patterns for each color channel with the location of a pixel in the digital color image to obtain an addressed halftone pattern value;
   c. means for utilizing the addressed halftone pattern value for each color channel to determine an output halftone image value for each color channel; and
   d. means for repeating steps b and c for each pixel in the digital color image.

* * * * *